(No Model.) 3 Sheets—Sheet 1.
F. N. CONNET & W. W. JACKSON.
INTEGRATING APPARATUS.
No. 529,365. Patented Nov. 20, 1894.
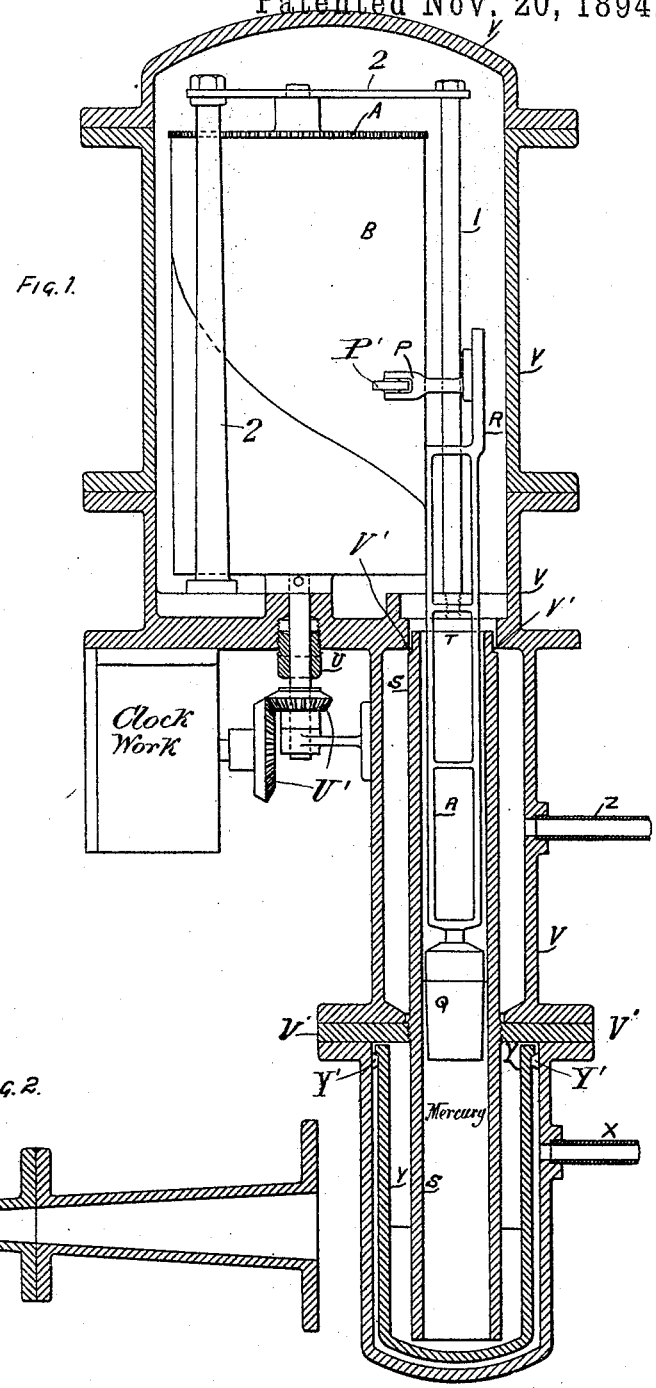
WITNESSES
Andrew D. Paine
Richard P. Jenks.
INVENTORS
Fred. N. Connet
Walter W. Jackson (No Model.) 3 Sheets—Sheet 2.
F. N. CONNET & W. W. JACKSON.
INTEGRATING APPARATUS.
No. 529,365. Patented Nov. 20, 1894.
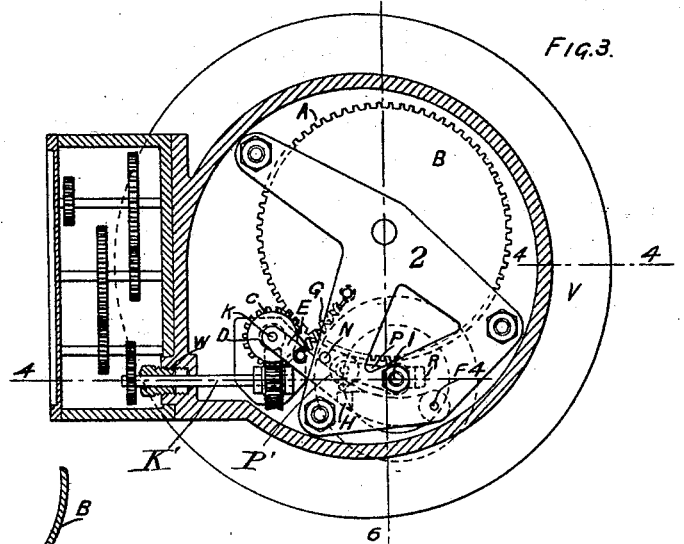
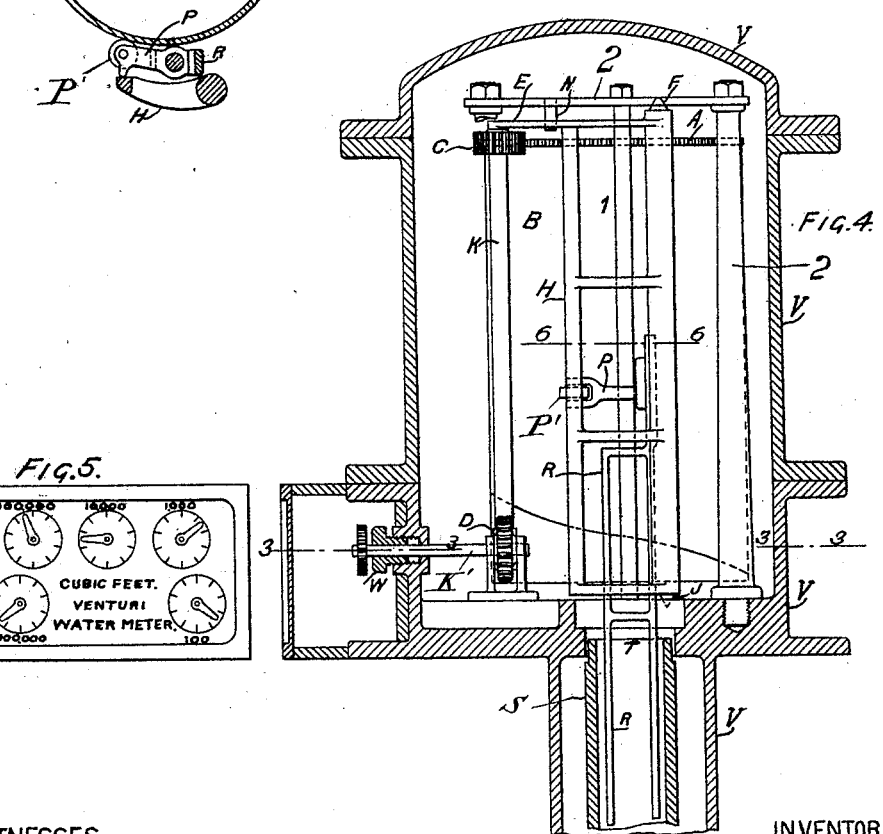
WITNESSES
Andrew D Paine
Richard P Jenks
INVENTORS
Fred. N. Connet.
Walter W Jackson (No Model.) 3 Sheets—Sheet 3.
F. N. CONNET & W. W. JACKSON.
INTEGRATING APPARATUS.
No. 529,365. Patented Nov. 20, 1894.
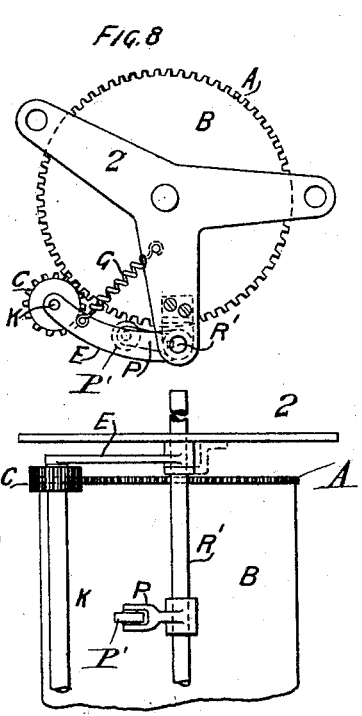
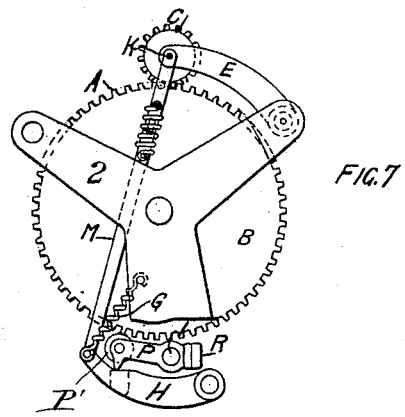
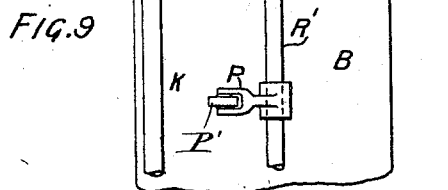
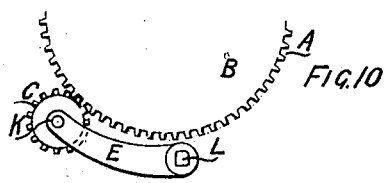
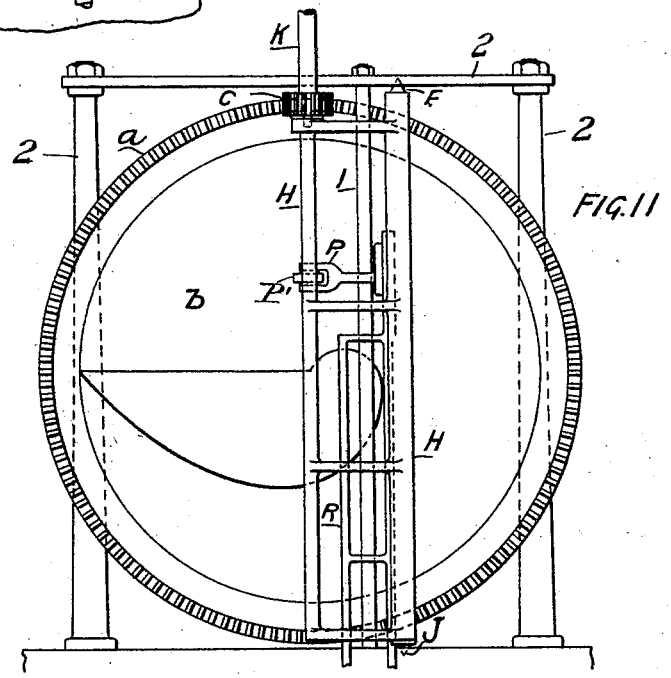
WITNESSES
Andrew D. Paine
Richard P. Jenks
INVENTORS
Fred. N. Connet
Walter W. Jackson

UNITED STATES PATENT OFFICE.

FREDERICK N. CONNET AND WALTER W. JACKSON, OF PROVIDENCE, RHODE ISLAND.

INTEGRATING APPARATUS.

SPECIFICATION forming part of Letters Patent No. 529,365, dated November 20, 1894.

Application filed February 2, 1894. Serial No. 498,859. (No model.)

*To all whom it may concern:*

Be it known that we, FREDERICK N. CONNET and WALTER W. JACKSON, both citizens of the United States, residing in the city and county of Providence and State of Rhode Island, have invented a new and useful improvement in integrating apparatus and new and useful arrangements in combining integrating apparatus with the Venturi meter of Clemens Herschel, of which the following is a specification.

Integrating machines or meters for the measuring of fluid, substances, &c., where the ratio of quantity to indicating intensity or force is variable, have been heretofore constructed in which a raised surface bounded by a curve is employed. The term indicating intensity rather than the term intensity only is employed herein, since in some instances as, for example in the particular object for which this improvement is designed, the intensity of force employed to affect the integrating apparatus may be the result of two or more forces of the same matter. This raised surface is formed as follows: A curve is obtained of which the ordinates represent the functions of quantity of the fluid or other matter to be integrated or measured, and the abscissæ correspond to the values of the quantities. This curve will of course vary with the physical laws of different substances. The other sides of the raised surface, being then formed by horizontal and vertical lines, this curve forms the third side, in such a way that the abscissæ are measured across the raised surface. The raised surface in other words, forms a right angled triangle, in which the hypotenuse has been replaced by the curve. This form of the raised surface may be modified by making the curve less on one side and compensating this loss by curving the opposite side, the only requirement being that the horizontal distance across the surface shall in every case equal the abscissa of the ordinate at that point. This raised surface is then preferably mounted upon a cylinder; but it may also be mounted upon a disk, in which case the ordinates must of course be measured in the direction of the radii and the abscissæ upon the circumferences of the corresponding circles; or the surface may be mounted upon a flat reciprocating surface. However mounted motion of revolution, or in the case of the flat surface reciprocating motion, is imparted to the body carrying the surface, either continuously or periodically by clock work, electricity, or other means. A wheel has been so placed with respect to this raised surface as to come into contact with it during the time in which it is in motion, and being rotated by the contact, operates a registering mechanism composed of an ordinary train of counting gears, with dials to represent units of the size and denominations required by the matter measured. It will be observed that as thus arranged the counting depends upon the friction between the traversing wheel, and the raised surface. A modification requires the surface to be cut into longitudinal teeth and the wheel to be replaced by a small gear. The position of the wheel or gear with respect to the raised surface is then varied under the influence of variations in the indicating intensity of the force, current, pressure, &c., of the matter measured or integrated, the wheel or gear being so placed that the variations in intensity will correspond with the ordinates of the curve. Thus as the path of the wheel or gear across the raised surface represents the abscissa of the curve, the rotation of the wheel will cause the registering mechanism to indicate the quantity passing, both the elements of time and intensity combining to make up the result. To permit this variation of position by the varying indicating intensity, the wheel or gear has been mounted on a splined shaft, along which it slides, and this shaft operates the counting train. To this arrangement there are numerous objections, particularly where the variations in the force or pressure are delicate. Thus the splined shaft is likely to become foul especially from corrosion where the apparatus is used in damp places, thus preventing the free movement of the wheel along it; and this becomes more important as the adjustment of the wheel, spline, and shaft, becomes more precise so as to lose nothing from the play of the wheel upon the shaft. Readings obtained from a wheel rolling on the surface both being fixed and unyielding, are unreliable, the contact being apt to be too slight to prevent some slip, or is likely to become so from wear between the surfaces. If greater pressure is applied to prevent this slip the wear becomes greater, and also the chance of loss from still another source increases. Thus where a small variation in the indicating intensity of the force, current, or pressure, is accompanied by a large difference in quantity, the curve forming the boundary of the raised surface may be, and frequently is, almost coincident with the path of the wheel in traversing it. Any increase of pressure upon the wheel under these circumstances tends to produce a sidewise movement of the wheel in passing on to or from the raised surface and thus delaying the beginning or accelerating the end of the period of time during which motion is communicated to the counting train; and the greater the lack of fine adjustment of the wheel upon the splined shaft, and the means by which its position upon it is fixed, the greater also is this loss. All these deficiencies become of very great importance where, as is frequently the case, the few inches traversed by the wheel, only at intervals of perhaps every five or ten minutes, represent very large quantities. Everything then which renders the apparatus more sensitive and delicate, and at the same time more positive in its action, becomes of great importance in obtaining accurate results, especially in the measurement of large quantities.

Our invention consists first in a new and novel arrangement of the parts of an integrating apparatus to accomplish these results; and second in combining it with, and particularly adapting it for use in connection with, the Venturi meter of Clemens Herschel, patented in this country April 17, 1888, and numbered 381,373.

The first part of our invention consists of improvements readily understood by referring to the annexed drawings hereby made a part of this specification.

Figures 1 and 2 are sectional drawings showing our integrating apparatus without details, and the Venturi meter of Herschel, and are designed particularly to show the means by which the pressures of the meter are made to affect the integrating apparatus. Figs. 3 and 4 show in detail the arrangement of the integrating apparatus itself. Fig. 3 is a plan from the top, in section largely of the top of the framework just inside the casing as hereinafter described, but partly upon the two lines marked 3—3 of Fig. 4. Fig. 4 is a sectional elevation upon the two lines marked 4—4 in Fig. 3. Fig. 5 represents the dials of the registering apparatus as shown on the face of Fig. 4. Fig. 6 shows in detail the relative position of the parts shown, and is drawn on line 6—6 of Fig. 4. Figs. 7, 8, 9, and 10 are details of modified constructions hereinafter explained; and Fig. 11 represents our integrating apparatus where the cylinder B is replaced by a circular disk $b$.

The integrating apparatus in itself without the combination thereof, as we prefer to construct it, may be described sufficiently for the purpose of understanding the detailed description of the parts hereinafter contained, as follows:

The entire integrating apparatus is inclosed in four compartments. See Figs. 1 and 4. One of these compartments, Fig. 4 next to Fig. 5, is occupied by the registering train O, consisting of a train of counting gears in the ordinary form and operating in the usual way. A second compartment marked "Clock-work" in Fig. 1 is occupied by ordinary clock-work mechanism, where that is employed as the motive force, which transmits motion to the other parts either continuously or periodically as desired. This clock-work also operates in the usual manner. A third compartment located at the bottom of Fig. 1 where the word "Mercury" appears will be more particularly described hereinafter. The fourth compartment, made water-tight by the outer casing V. V. V., as hereinafter particularly described, contains the main working parts of the apparatus in the arrangement, construction, and combinations, of which our invention consists. In this compartment is arranged a main frame-work, 2, 2, 2, in which are mounted the various parts. A cylinder, B, carrying the surfaces before referred to, and again hereinafter more fully described, and indicated by the curved lines in Figs. 1 and 4, is mounted in this frame-work so as to rotate upon its axis as driven by the clock-work, by means of the bevel gears, U', Fig. 1; the shaft forming its axis being carried outside the walls of the compartment for this purpose. Some form of mechanism as the wheel P' is arranged to traverse the surfaces carried by the cylinder as the latter rotates, its position vertically being determined by the intensity of the force or matter integrated, as more fully hereinafter set forth. This wheel P', is so mounted in the forked arm P that when passing over the raised surface of the cylinder B, it causes this arm to press against the part H. This latter is shown in good detail in Figs. 4 and 6 of the drawings and consists of a framework of metal extending the length of the cylinder B. and pivoted at top and bottom in the frame-work of the apparatus as at F and J. For lack of any other or better term to apply to this part, we have hereinafter in specification and claims called it a "vane." Attached to the top of this vane H, and forming a part thereof is the arm E, having a spring G attached near its free end, the other end of this spring being attached to the frame-work of the apparatus. It is thus evident that as the wheel P', passes over the raised surface on the cylinder B and presses against the vane, H, this will turn upon its pivots F and J, and cause a lateral movement of the free end of the arm E, this arm and vane H being pulled back again by the spring the instant the wheel P' ceases to press against vane H by passing off the raised surface. In this free end of the arm E is journaled the upper end of the shaft K, its lower end being journaled in the framework. Near the upper end of shaft K is attached the pinion C. This pinion is so arranged that it may mesh with a gear A, attached to and rotating with the cylinder, B. Near the other end of the shaft K and attached thereto is a worm, which by means of the worm and gear, (these are shown together at D, Fig. 4,) and the horizontal shaft K' passing out through the stuffing box W operates the registering train O.

The operation of the mechanism then is, that so long as the pinion C is in mesh with the gear A the motion communicated to the cylinder by the clock-work is transmitted to the registering train. The construction of the arm E is such however, that when the wheel, P', is passing over the raised surface and pressing against vane H, as before described, it swings the arm E on its pivot, and in doing so swings the upper end of the shaft K outward from the cylinder and thereby withdraws the pinion C from its mesh with the gear A. Consequently no motion is transmitted to the registering train while the wheel, P' is passing over this raised surface.

With this general description of the apparatus, we proceed to notice the parts more in detail.

The surface bounded by the curve of indicating intensity and quantity as before described is here shown as a depressed surface, this form being preferred by us, and the traversing mechanism is arranged to permit the action of the registering mechanism while this depressed surface is passing under it. In other words the traversing mechanism while passing over the remaining surface prevents the operating of the registering mechanism. It will thus be seen that these two surfaces, that formed in accordance with the physical laws of the fluid or matter measured, whether raised or depressed, and the remaining surface of the cylinder, disk, or other body, are in a sense complements of each other, and together regulate the action of the registering mechanism, not only in our improved form but also in all other forms, and this is true whether the surfaces are upon a cylinder, disk, or a reciprocating piece. We have therefore hereinafter in this specification and its claims, called these two surfaces thus formed, "regulating surfaces," for the sake of clearness and brevity. In the annexed drawings we have generally shown these surfaces mounted upon a cylinder B as the more convenient form; but it is to be understood that we do not confine ourselves to this construction, our improvements being equally applicable if a disk, as shown in Fig. 11, is used, or even a reciprocating body.

A positive action of the registering mechanism without possibility of loss from slip is obtained by means of the pinion C meshing with the gear A operated with the cylinder B to which it may be attached. The adoption of this arrangement also permits of the meshing and withdrawal from mesh, of the pinion and gear, to be made at the instant that the traversing mechanism passes on or off the surface formed by the curve of the indicating intensity. This pinion by means of the shaft K and worm D operates the counting train or registering mechanism O as before described. The teeth of the pinion C and gear A are cut small so that a slight movement of the arm E under the influence of the pressure exerted upon it by the wheel P', acting through the vane H will serve to throw them out of mesh. The arm, pinion, and shaft are of such a construction that a light spring G will pull the pinion into gear when permitted to so act, or it may be made to act by expansion where the arrangement of other parts makes it desirable. The use of the spring G to bring the gear into mesh, in place of a fixed and rigid arrangement of gear and pinion, is also a manifest advantage in overcoming the defect of the teeth striking one another at the instant of coming together. Although the use of this spring permits the simplest arrangement of these parts, any means or construction will answer the purpose which will compel the traversing mechanism to properly follow the raised and depressed portions of the regulating surfaces, as a sheet metal shield around the cylinder B and so shaped as to correspond with the surface of the cylinder, leaving a space between it and the surface of the cylinder just large enough for the traversing mechanism to loosely fill. This shield may be attached to the top of the cylinder, other parts being of course so modified as to permit its use.

Between the vane H and the cylinder B, disk, or other form, as the case may be, is some mechanical means for traversing the regulating surfaces and in this improvement it is immaterial whether this mechanism is a wheel, merely a finger, or some other shape. Whatever it is, it is hereinafter in specification and claims called "traversing mechanism." Fig. 6 represents in detail the relative position and arrangement of the cylinder, vane, and traversing mechanism. In any case this traversing mechanism should be so arranged as to press against the vane H while passing over the raised portion of the surface of the cylinder or disk. In the arrangement of the parts here shown it is evident that while this finger or wheel P' is passing over the raised surface and pressing against the vane H the latter by means of the arm E will throw the pinion C out of gear; while the same elements will permit the spring G to pull it into gear while the finger or wheel is passing over the depressed surface. It is not of great consequence however that this arrangement is adopted. A simple change in the position or shape of the parts would enable the meshing of the gear to take place when the traversing mechanism is passing over the raised portion of the surface, as for instance placing the arm E on the other side of the gear A and connecting it by an intermediate piece M with the vane H as shown in Fig. 7. This piece M may in such case be advantageously made in two pieces with a spring between them, to maintain an elastic, in place of a rigid, connection between the vane and the pinion; but the form shown has been adopted as on the whole the better and simpler. The teeth of the gear and pinion are prevented from "bottoming" by the stop, N Fig. 3, inserted in or attached to the frame-work in such a position that the arm E will come in contact with it at the instant that the gear A and pinion C are properly meshed; but whether this stop N is used or not, the arrangement should always be such that when the gear and pinion are in mesh there shall be a space between the vane and the depressed surface slightly larger than the space occupied by the traversing mechanism, say one thirty-secoundth of an inch greater. If then the apparatus in its periodical rotations, where a periodical movement is adopted, is always stopped so that the wheel or finger is opposite the depressed surface the extra space will permit a perfectly free movement of this traversing mechanism according to the intensity of force of the matter measured, without pressure from any of the parts, a point of great consequence to the attainment of accurate results. It is also evident that by this arrangement the only force tending to drive the traversing mechanism off the edge of the raised surface, is that exerted by the spring G which may be made very slight, and yet by means of the positive gearing of gear and pinion transmit every movement to the registering mechanism.

The traversing mechanism is fixed to the shaft or float-stem, R. As shown in the drawings this float-stem R, as it is perhaps better called in our special adaptation of the integrating apparatus, is shown constructed of two parallel pieces with several cross-ties, and is so arranged that the shaft 1, fixed to the upper frame-work will serve as a guide-rod for it in its motion up and down by passing through its cross-ties for that purpose. The forked arm P serves to connect the wheel P', with this float-stem R, when wheel P' is used. Where it is not used, the arm P may itself be readily so shaped as to follow the regulating surfaces, and press against the vane H, thus performing all the functions of the wheel P'. To enable us to fasten this arm P fixedly to the shaft and by so doing avoid the use of any spline, and slip from any means of sliding it upon the shaft, we bring the mechanism by which the indicating intensity actuates this traversing mechanism directly under the end of the shaft, and cause it to actuate the entire shaft. This mechanism will vary of course with the matter measured or integrated, as for instance a magnet for electricity, diaphragms for some forces, mercury acted upon by forces as in this case, &c. Whatever the mechanism employed for this purpose it would seem that it might always be placed in this position; but we do not confine ourselves to this position. Our object is to connect the operative portion of the mechanism acted upon by the force, as the armature of the magnet, or, as here, the float floating in mercury, and the traversing mechanism positively and fixedly, without joints and parts movable with respect to each other; since all such joints and movable parts, necessarily permit more or less slip and play. Any position of this mechanism actuated by the indicating intensity, which will permit this result, will therefore accomplish our object; whether directly below or not; or whether below or above or at one side. A position directly below or in some cases above, the shaft, would seem always to be preferable, these positions permitting direct action combined with great freedom of movement and without counterbalancing to prevent binding. This freedom of movement may with this arrangement be further aided, if deemed advisable, by so shaping the vane as to loosely inclose the traversing mechanism and thus form a sufficient guide for it in its motion up and down, and thereby do away with any other means for this purpose; and where in the claims a fixed and positive connection with this mechanism is spoken of, a connection with the portion movable under the influence of the force exerted is meant, as the float here, or the armature of a magnet, since a magnet and armature may be used with this invention as an equivalent motive force. In some cases it is evident that the weight of the parts connecting this mechanism with the traversing mechanism should be counter-balanced. Nothing of that kind is shown in these drawings it being unnecessary for our special purpose.

The vane H is not an absolutely necessary arrangement. Its place may be supplied by attaching a shaft similar to the guide-shaft 1, to the float-stem R, virtually making it a part thereof as it is indicated to be by the letter R' in Fig. 9, permitting this shaft to run through the frame-work of the apparatus, which will then form a sufficient guide for the entire stem, and pivoting the arm E, as a piece separate from the vane H, loosely upon this shaft; then by means of a spline in the shaft R, as shown in Fig. 8, or by making the shaft of some shape other than round, as at L in Fig. 10, cause it to swing the pinion C in and out of mesh, as the shaft 1 is turned by the traversing mechanism. There is no necessity in this arrangement of having the shaft fit at all perfectly through the arm E. It may be loose enough not to be interfered with by fouling, and yet made to work well. Of course in such an arrangement some provision would have to be made in the outer casing to permit the end of the shaft 1, sufficient space to rise; but this is easily accomplished by a pipe closed at the top and screwed into an orifice in the casing, permitting the end of the shaft to run up inside. We however prefer the arrangement shown in the main drawings, using the vane H.

Where in the claims of this specification the gear is spoken of as being operated with the regulating surfaces, it is meant that it is operated during the same period of time. The most natural means for effecting this is to attach it to the same body which carries the regulating surfaces, but of course this is not essential. Again in the case of a reciprocating surface this gear would naturally, though not necessarily, become a rack. These and similar modifications are included under the term "gear operated with said regulating surfaces."

All of the above improvements will prove of value in measuring many kinds of matter; but we have secondly designed this apparatus particularly for use in combination with the water-meter called by its inventor, Clemens Herschel, the Venturi meter, a simple representation of which is shown in Fig. 2. By referring to his Letters Patent No. 381,373, of April 17, 1888, it will be seen that from the difference in the pressures of the water in the main above the contraction, and that at the contracted portion of the pipe or meter is calculated the quantity of water passing, and to integrate and register this total quantity through the variations of this difference of pressures from time to time, or continuously as may be preferred, is the particular object of this invention. For this purpose the depressed portion, (or raised portion if that should be preferred,) of the regulating surfaces is shaped in the ordinary way, the variations in the difference of the pressures, which here represent the indicating intensity, being represented by the ordinates of the outside curved boundary of the surface and the quantity of water due to the differences of the pressures by the abscissæ.

In practice the water-main and Venturi tube are generally, of course, located under ground, as in the case of any water-main; but while our integrating apparatus may be placed in a casing set in the ground close to the main, it may also and preferably be located anywhere in the vicinity, as above ground in any convenient position, it being understood that in any case it is connected with the main and Venturi tube by small pipes, representing the priezometer tubes of the Herschel patent, connecting it the one with the main and the other with the Venturi tube. These small connecting pipes are filled with the water from the water-main at their respective points of connection therewith, and thus transmit to the integrating apparatus through the water the same pressures as exist in the main at those points.

If we assume that the main and Venturi tube of Fig. 2 are placed under ground, and the integrating apparatus of Fig. 1 situated at any convenient place in the vicinity, the tubes or pipes marked X in the two figures would be in practice connected together thus transmitting the pressure of the main to the lower portion of the integrating apparatus; and so also the tubes or pipes marked Z would also be similarly connected and for a similar purpose. Herschel's meter includes not only the Venturi tube in itself, but also these pipes or tubes to transmit the pressures and mechanism of the several kinds shown in his patent for making practical use of these pressures. Wherever therefore the term Venturi meter is used in the claims it is to be understood that the complete mechanism in some one of the forms shown by Herschel is meant. Our invention as to this portion of it, consists in so arranging the relative position of the meter and integrating apparatus, and their connecting parts, and so constructing and incasing these parts as to best produce an accurate and sensitive combination. To effect this purpose we bring together the tubes X and Z, Figs. 1 and 2, as just described preferably directly under the integrating apparatus, as indicated above in the first part of this specification as the best position for it. Our improved integrating apparatus can with advantage be used in combination with the Venturi meter without being thus placed; but this position is preferable in making it easy to accomplish other results, hereinafter described. These two tubes may unite in an ordinary U tube, the float hereinafter described then being placed in one of its limbs; or, as we prefer and show in the drawings, one tube may surround the other. In practice we accomplish this by means of the tube S, Fig. 1. This tube open at both ends is constructed with a flange shown at V', and by bolting this flange between flanges on the two portions of the outer casing V, as shown at the same point, we divide the outer casing into two compartments, and connect each of these with one of the pipes or tubes leading from the water main and Venturi tube, as above described. The tube S being open at its top, and spaces being left around it in constructing the apparatus, for the free passage of the water over its top from the Venturi tube entering the upper compartment as shown near the point marked T in Fig. 1, the pressure exerted by the water is transferred to the inside of the tube S, and the latter thus becomes for the purposes of this invention a part of the pipe or tube Z. The tube S then extends downward and inside but without reaching the bottom of the other compartment which, connected by the pipe X to the main, becomes practically a part of that pipe, or tube; so that tube S forming a part of tube Z becomes for the purposes of this invention the inner of the two pipes Z and X; and that is what is hereinafter meant when it is called the inner tube or pipe. Mercury may then be placed in the closed bottom of the lower compartment or outer tube. In the use of mercury however it is necessary to make the vessel containing it of some substance through which it cannot pass, owing to its well known tendency to penetrate even solid substances. To permit us to use such substances as glass or hard rubber for this purpose and yet protect the vessel against breakage in transportation and use, we support the glass or rubber vessel Y, inside an enlargement of the outer tube by means of studs or projections Y' upon the inner surface of the outer casing permitting the water in the tube to surround the outside thereof as shown in Fig. 1 and are thus enabled to use vessels which would otherwise be far too fragile for the purpose. Whether this cup Y is used or not, the lower end of the tube S must dip into the mercury. Thus it will be seen that the pressures of the main and the Venturi tube are transmitted by means of the water in the pipes, or tubes, X and Z, to the mercury in the vessel Y; and the height to which the mercury will go in the tube S will thus depend upon the excess of pressure transmitted by the pipe or tube X over that transmitted by the pipe or tube Z. When these pressures are the same, of course the mercury would stand at the same height inside and outside of the tube S. In Fig. 1 it is represented as raised inside by the excess of pressure in the pipe or tube X, and its height is indicated by the horizontal line drawn across the float Q; its height outside of the tube S being indicated by the lines drawn near the bottom and outside of the tube S.

In the mercury floats a float Q, which we prefer to make of hard rubber, fixed to the end of the float-stem R of the integrating apparatus proper. This float is here shown raised from its zero position by the height of the mercury, as above described, its zero position of course being that which it would assume when the mercury, under the influence of equal pressures in the main and Venturi tube, is at an equal height inside and outside of the tube S. In the construction of our apparatus we so proportion the parts that when this float is at this zero position, the traversing mechanism, as the wheel P', is at the bottom of the registering surfaces, and rises as the mercury in the tube S rises. It will ordinarily, we think, be more convenient to place this float Q in the inner tube; but it is immaterial to the proper working of the apparatus in which it is placed; and it is also immaterial which is the inner tube, that from the main or from the contracted throat. Whatever arrangement is employed, however, in these respects, the regulating surfaces must of course correspond; that is, for instance, if the relative position of the tubes as shown in the drawings be reversed, the surfaces must also be turned upside down on the drum.

Any stuffing box around the float-stem R between the tubes and the integrating apparatus, as at the point T would of course have a tendency to prevent the free movement of the shaft and in accordance with our desire to avoid all sources of friction, we have done away with the necessity of this stuffing box, by making the outer casing V. V. V., inclosing the regulating surfaces and some other parts, water-tight, and thus practically for the purposes of this invention making it a part of the pipe Z and inner tube S, thereby freely permitting the water to surround these parts. The mechanism to drive the cylinder, as the clock work, O, or other body supporting the regulating surfaces is carried into, and the connection between the pinion and the registering mechanism, taken out of this casing through stuffing boxes; as at U and W, Figs. 1 and 4; but stuffing boxes in these positions manifestly do not interfere with the sensitiveness and accuracy of the apparatus.

In the annexed drawings we have shown the regulating surfaces, traversing mechanism, vane, gear, spring, &c., inside the water-tight casing; but it is evident that it would be quite possible to put some of these outside, as for example the gears and spring by carrying the pivot of the vane, as at F outside through a stuffing box and thereby controlling the meshing of the outside gears, without perceptibly reducing the sensitiveness of the apparatus, and without departing from the spirit of this feature of our invention; and there may be still other arrangements of the parts in this respect. We do not therefore confine ourselves to the exact arrangement shown in the drawings, and where in the claims, the words "said integrating apparatus being incased in a water-tight casing," are used, we do not thereby mean to confine ourselves to an arrangement requiring either all the elements of the integrating apparatus or those elements shown in the drawings, to be so incased, but use them for the sake of brevity and clearness to cover the idea of making the casing part of a pressure tube and placing therein the regulating surfaces, traversing mechanism, and such other elements as may be preferred; and this feature of our invention is equally applicable where other forms of integrating apparatus, not using the regulating surfaces, are employed, by placing in the casing the more essential features.

What we claim is—

1. In an integrating apparatus, the combination of regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements.

2. In an integrating apparatus, the combination of regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces, and a pinion so arranged that it may mesh with said gear and when in mesh operate registering mechanism; the meshing of said pinion with said gear being controlled by the joint action of said regulating surfaces and traversing mechanism acting through said vane.

3. In an integrating apparatus, the combination of regulating surfaces, as described to which motion is imparted, mechanism to traverse these surfaces and whose position relative to said surfaces is varied by the force or matter integrated, a vane extending the length of said surfaces, a spring, a gear operated with said surfaces, and a pinion so arranged that it may mesh with said gear and when in mesh operate registering mechanism; the meshing of said pinion with said gear being controlled by said spring when and as permitted by the joint action of said regulating surfaces and traversing mechanism acting through said vane.

4. In an integrating apparatus, the combination of regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements, and the various parts being so proportioned and arranged that when opposite the depressed surface the traversing mechanism is free to assume any position under the influence of variations in intensity without pressure from the other elements.

5. In an integrating apparatus the combination of regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces, and a pinion so arranged that it may mesh with said gear and when in mesh operate registering mechanism; the meshing of said pinion with said gear being controlled by the joint action of said regulating surfaces and traversing mechanism acting through said vane, and the various parts being so proportioned and arranged that when opposite the depressed surface the traversing mechanism is free to assume any position under the influence of variations in intensity without pressure from the other elements.

6. The combination of a float, floating in the mercury of a Venturi meter, with an integrating apparatus having regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements.

7. The combination of a float, floating in the mercury of a Venturi meter, with an integrating apparatus having regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces, and a pinion so arranged that it may mesh with said gear and when in mesh operate registering mechanism; the meshing of said pinion with said gear being controlled by the joint action of said regulating surfaces and traversing mechanism acting through said vane.

8. The combination of a float, floating in the mercury of a Venturi meter, with an integrating apparatus having regulating surfaces as described to which motion is imparted, mechanism to traverse these surfaces and whose position relative to said surfaces is varied by the force or matter integrated, a vane extending the length of said surfaces, a spring, a gear operated with said surfaces, and a pinion so arranged that it may mesh with said gear and when in mesh operate registering mechanism; the meshing of said pinion with said gear being controlled by said spring when and as permitted by the joint action of said regulating surfaces and traversing mechanism acting through said vane.

9. The combination of a float, floating in the mercury of a Venturi meter, with an integrating apparatus having regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements, and the various parts being so proportioned and arranged that when opposite the depressed surface the traversing mechanism is free to assume any position under the influence of variations in intensity without pressure from the other elements.

10. The combination of a float, floating in the mercury of a Venturi meter, with an integrating apparatus having regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces and a pinion so arranged that it may mesh with said gear and when in mesh operate registering mechanism; the meshing of said pinion with said gear being controlled by the joint action of said regulating surfaces and traversing mechanism acting through said vane, and the various parts being so proportioned and arranged that when opposite the depressed surface the traversing mechanism is free to assume any position under the influence of variations in intensity without pressure from the other elements.

11. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements.

12. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces, and a pinion so arranged that it may mesh with said gear and when in mesh operate registering mechanism; the meshing of said pinion with said gear being controlled by the joint action of said regulating surfaces and traversing mechanism acting through said vane.

13. The combination of a Venturi meter with an integrating apparatus having regulating surfaces as described to which motion is imparted, mechanism to traverse these surfaces and whose position relative to said surfaces is varied by the force or matter integrated, a vane extending the length of said surfaces, a spring, a gear operated with said surfaces, and a pinion so arranged that it may mesh with said gear and when in mesh operate registering mechanism; the meshing of said pinion with said gear being controlled by said spring when and as permitted by the joint action of said regulating surfaces and traversing mechanism acting through said vane.

14. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements and the various parts being so proportioned and arranged that when opposite the depressed surface the traversing mechanism is free to assume any position under the influence of variations in intensity without pressure from the other elements.

15. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces, and a pinion so arranged that it may mesh with said gear and when in mesh operate registering mechanism; the meshing of said pinion with said gear being controlled by the joint action of said regulating surfaces and traversing mechanism acting through said vane and the various parts being so proportioned and arranged that when opposite the depressed surface the traversing mechanism is free to assume any position under the influence of variations in intensity without pressure from the other elements.

16. The combination consisting of an integrating apparatus, a water-tight casing surrounding said apparatus, and one of the tubes of a Venturi meter, said tube being connected with said casing so that the water in the tube may flow into and fill the casing substantially as described.

17. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements, and said integrating apparatus being incased in a water-tight casing forming a part of one of the tubes of said meter.

18. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces, and a pinion so arranged that it may mesh with said gear and when in mesh operate registering mechanism; the meshing of said pinion with said gear being controlled by the joint action of said regulating surfaces and traversing mechanism acting through said vane, and said integrating apparatus being incased in a water-tight casing forming a part of one of the tubes of said meter.

19. The combination of a Venturi meter with an integrating apparatus having regulating surfaces as described to which motion is imparted, mechanism to traverse these surfaces and whose position relative to said surfaces is varied by the force or matter integrated, a vane extending the length of said surfaces, a spring, a gear operated with said surfaces, and a pinion so arranged that it may mesh with said gear and when in mesh operate registering mechanism; the meshing of said pinion with said gear being controlled by said spring when and as permitted by the joint action of said regulating surfaces and traversing mechanism acting through said vane, and said integrating apparatus being incased in a water-tight casing forming a part of one of the tubes of said meter.

20. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, and a pinion so arranged that it may mesh with said gear and when in mesh operate registering mechanism; the meshing of said pinion with said gear being controlled by the joint action of said regulating surfaces and traversing mechanism by means of intermediate mechanical elements and the various parts being so proportioned and arranged that when opposite the depressed surface the traversing mechanism is free to assume any position under the influence of variations in intensity without pressure from the other elements, and said integrating apparatus being incased in a water-tight casing forming a part of one of the tubes of said meter.

21. The combination of a Venturi meter with an integrating apparatus having regulating surfaces as described to which motion is imparted, mechanism to traverse these surfaces and whose position relative to said surfaces is varied by the force or matter integrated, means for keeping these surfaces and traversing mechanism in contact, a vane extending the length of said surfaces, a gear operated with said surfaces, and a pinion so arranged that it may mesh with said gear and when in mesh operate registering mechanism; the meshing of said pinion with said gear being controlled by the joint action of said regulating surfaces and traversing mechanism acting through said vane and the various parts being so proportioned and arranged that when opposite the depressed surface the traversing mechanism is free to assume any position under the influence of variations in intensity without pressure from the other elements, and said integrating apparatus being incased in a water-tight casing forming a part of one of the tubes of said meter.

22. The combination of a Venturi meter having a vessel containing the mercury thereof, said vessel being surrounded by the water of the meter under pressure, with an integrating apparatus.

23. The combination of an integrating apparatus with a float floating in the mercury of a Venturi meter, said mercury being contained in a vessel surrounded by the water of the meter under pressure.

24. The combination of a Venturi meter having a vessel containing the mercury thereof, said vessel being surrounded by the water of the meter under pressure, and an integrating apparatus, said apparatus being incased in a water-tight casing forming a part of one of the tubes of said meter.

25. The combination of an integrating apparatus with a float floating in the mercury of a Venturi meter, said mercury being contained in a vessel surrounded by the water of the meter under pressure, and said integrating apparatus being incased in a water-tight casing forming a part of one of the tubes of said meter.

26. In an integrating apparatus, the combination of regulating surfaces as described to which motion is imparted, mechanism to traverse these surfaces and whose position relative to said surfaces is varied by the force or matter integrated, means for keeping these surfaces and traversing mechanism in contact, a gear operated with said surfaces, a pinion so arranged that it may mesh with said gear and when in mesh operate registering mechanism, and the mechanism actuated by the indicating intensity of the force or matter integrated; the meshing of said pinion with said gear being controlled by the joint action of said regulating surfaces traversing mechanism by means of intermediate mechanical elements, and said traversing mechanism and the mechanism actuated by said intensity being rigidly connected together.

27. In an integrating apparatus, the combination of regulating surfaces as described to which motion is imparted, mechanism to traverse these surfaces and whose position relative to said surfaces is varied by the force or matter integrated, means for keeping these surfaces and traversing mechanism in contact, a vane extending the length of these surfaces, a gear operated with said surfaces, a pinion so arranged that it may mesh with said gear and when in mesh operate registering mechanism, and the mechanism actuated by the indicating intensity of the force or matter integrated; the meshing of said pinion with said gear being controlled by the joint action of said regulating surfaces and traversing mechanism acting through said vane, and said traversing mechanism and the mechanism actuated by said intensity being rigidly connected together.

28. In an integrating apparatus, the combination of regulating surfaces as described to which motion is imparted, mechanism to traverse these surfaces and whose position relative to said surface is varied by the force or matter integrated, a vane extending the length of these surfaces, a spring, a gear operated with said surfaces, a pinion so arranged that it may mesh with said gear and when in mesh operate registering mechanism, and the mechanism actuated by the indicating intensity of the force or matter integrated; the meshing of said pinion with said gear being controlled by said spring as and when permitted by the joint action of said regulating surfaces and traversing mechanism acting through said vane, and said traversing mechanism and the mechanism actuated by said intensity being rigidly connected together.

FREDK. N. CONNET.
WALTER W. JACKSON.

Witnesses:
ARTHUR A. FULLER,
WM. R. TILLINGHAST.